US012432135B2

(12) United States Patent
Yu et al.

(10) Patent No.: US 12,432,135 B2
(45) Date of Patent: Sep. 30, 2025

(54) SYSTEMS AND METHODS FOR HEALTH BASED ROUTING IN AN SDWAN

(71) Applicant: Fortinet, Inc., Sunnyvale, CA (US)

(72) Inventors: Kun Yu, San Jose, CA (US); Xiang Fan, San Jose, CA (US); Yanheng Wei, San Jose, CA (US); Di Liang, Danville, CA (US); Chih Ho Yen, Newark, CA (US)

(73) Assignee: Fortinet, Inc., Sunnyvale, CA (US)

( * ) Notice: Subject to any disclaimer, the term of this patent is extended or adjusted under 35 U.S.C. 154(b) by 97 days.

(21) Appl. No.: 18/237,250

(22) Filed: Aug. 23, 2023

(65) Prior Publication Data
US 2025/0071050 A1    Feb. 27, 2025

(51) Int. Cl.
*H04L 45/302*  (2022.01)
*H04L 45/02*  (2022.01)
*H04L 45/76*  (2022.01)

(52) U.S. Cl.
CPC ............ *H04L 45/302* (2013.01); *H04L 45/02* (2013.01); *H04L 45/76* (2022.05)

(58) Field of Classification Search
CPC ........ H04L 45/02; H04L 45/302; H04L 45/76
See application file for complete search history.

(56) References Cited

U.S. PATENT DOCUMENTS

| | | | |
|---|---|---|---|
| 7,801,030 B1* | 9/2010 | Aggarwal | H04L 45/04 370/227 |
| 2016/0098327 A1* | 4/2016 | Detienne | H04L 69/40 714/4.2 |
| 2019/0036808 A1* | 1/2019 | Shenoy | H04L 45/123 |
| 2021/0306247 A1* | 9/2021 | Duan | H04L 43/10 |
| 2023/0028872 A1* | 1/2023 | Ramaswamy | H04L 45/38 |
| 2023/0070701 A1* | 3/2023 | Wang | H04L 41/5012 |
| 2023/0116163 A1* | 4/2023 | Scholz | H04L 61/2567 370/392 |

* cited by examiner

*Primary Examiner* — Schquita D Goodwin
*Assistant Examiner* — Mehulkumar J Shah
(74) *Attorney, Agent, or Firm* — Law Office of Dorian Cartwright; Dorian Cartwright

(57) ABSTRACT

Various systems, devices, storage media, and methods are discussed for selecting communication paths based upon health status in a hub and spoke communication network.

16 Claims, 6 Drawing Sheets

SYSTEMS AND METHODS FOR HEALTH BASED ROUTING IN AN SDWAN

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2023, Fortinet, Inc.

FIELD

Embodiments discussed generally relate to systems and methods for controlling communications in a communication network, and more particularly to systems and methods for selecting communication paths based upon health status in a hub and spoke communication network.

BACKGROUND

Many enterprise networks are configured in a hub and spoke topology where the spokes govern network communications within a segment of the enterprise, and where inter-segment communications are performed via a hub. Such an approach provides for centralized control at the hub, but also results in significant and unnecessary traffic transiting the hub.

Accordingly, there is a need in the art for advanced systems and methods for network security that provides for both centralized control at the hub, but also offloading.

SUMMARY

Various systems, devices, storage media, and methods are discussed for selecting communication paths based upon health status in a hub and spoke communication network.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
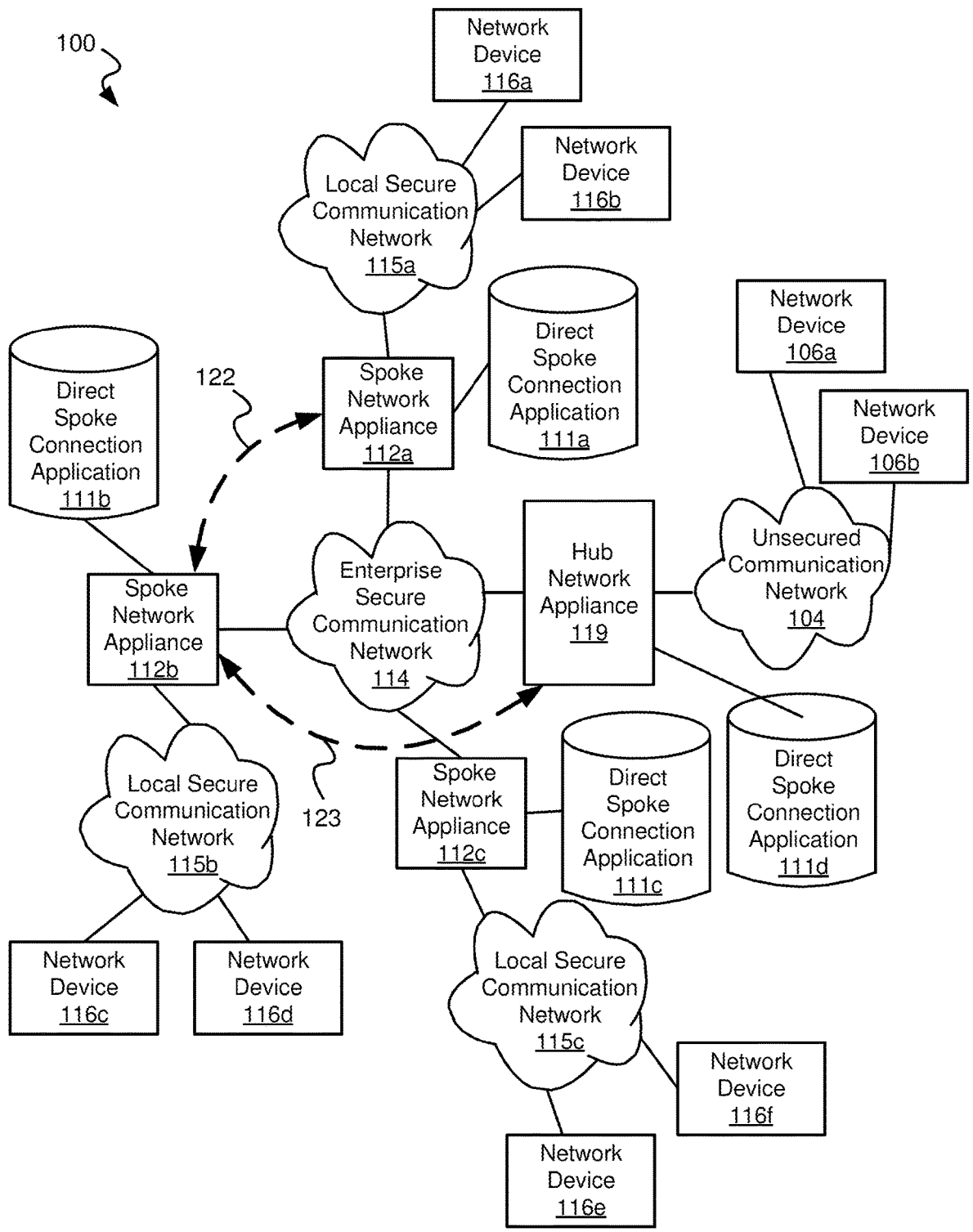
FIGS. 1A-1E illustrate a network architecture including health based spoke network appliance to spoke network appliance communication links in part governed by a hub network appliance in accordance with various embodiments.

Various systems, devices, storage media, and methods are discussed for selecting communication paths based upon health status in a hub and spoke communication network.

Some communication networks rely upon internet protocol security (IPsec) overlays to support implementation of software defined wide area networks (SDWAN). Such IPsec overlays are often used in a hub and spoke topology where access to subsets of network devices in the SDWAN are governed by respective spoke network appliances, and each of the spoke network appliances are communicably coupled to a hub network appliance. In such a configuration communications between a first network device governed by one spoke network appliance and a second network appliance governed by another spoke network appliance is performed via the hub network appliance.

Such communication via the hub network appliance assures centralized control by the hub network appliance, but also results in considerable network traffic transiting the hub network appliance and can also result in increased communication latency. In some embodiments discussed herein, communication links are established directly between at least some of the spoke network appliances. In such embodiments, communications between one spoke network appliance and another spoke network appliance includes an initiating spoke network appliance sending network traffic to the hub network appliance. In turn, the hub network appliance directs the initiating spoke network appliance to communicate with the other spoke network appliance (i.e., the target spoke network appliance) via a direct communication link between the respective spoke network appliances.

Some embodiments discussed herein include a first set of multiple communication links between a spoke network appliance and a hub network appliance, and a second set of multiple communication links between respective ones of the spoke network appliances. Thus, for example, a spoke network appliance may include two or more communication links between it and the hub network appliance, where each of the two or more communication links is provided and supported by different internet service provider (ISP). The same spoke network appliance may include two or more communication links between it and another spoke network appliance, where each of the two or more communication links is provided and supported by, for example, different internet service providers (ISPs). In such an embodiment, a variety of conditions may be analyzed to select which of the multiple communication links will be used to carry out any communications from a given spoke network appliance.

For network traffic destined for outside of the secure communication network including the initiating spoke network appliance and the hub network appliance, the process begins by the initiating spoke network appliance sending network traffic to the hub network appliance via two or more communication links between it and the hub network appliance. The hub network appliance analyzes characteristics of the received network traffic to determine a respective health status for each of the multiple communication links. This health status may include a number of different characteristics including, but not limited to, a latency of the network traffic, a rate at which the network traffic is received, an error rate of the received network traffic, and/or a cost of using the respective communication link. Based upon the disclosure provided herein, one of ordinary skill in the art will recognize a variety of characteristics that may be included in the health status in different embodiments.

Based at least in part on the health status pf each of the respective communication links, the hub network appliance selects one of the multiple communication links and requests that the initiating spoke network appliance use the selected communication link. Following this selection, the initiating spoke network appliance proceeds to use the selected one of the multiple communication links to carry network traffic destined for outside of the secure communication network.

In contrast, for network traffic destined for another spoke within the secure communication network, the process again begins by the initiating spoke network appliance sending network traffic to the hub network appliance via two or more communication links between it and the hub network appliance. Where the hub network appliance determines that there is a direct communication link between the initiating spoke network appliance and the destination (i.e., the target spoke network appliance), the hub network appliance does not determine the health status for each of the multiple communication links. The determination that there is a direct communication link between the two spoke network appliances is made by the hub network appliance based upon routing tables indicating the overall topology of the secure network.

Instead of determining the health status of the communication links, the hub network appliance directs the initiating spoke network appliance to perform the desired network communications directly with the target spoke network appliance. Based in part upon the direction from the hub network appliance, the initiating spoke network appliance sends network traffic to the other spoke network appliance via two or more communication links between it and the other spoke network appliance. In turn, the initiating spoke network appliance analyzes characteristics of the communications between the spoke network appliances to determine a respective health status for each of the multiple communication links. Again, this health status may include a number of different characteristics including, but not limited to, latency of the network traffic, rate at which the network traffic is received, error rate of the received network traffic, and/or cost of using the respective communication link. Based upon the disclosure provided herein, one of ordinary skill in the art will recognize a variety of characteristics that may be included in the health status in different embodiments.

Based at least in part on the health status, the initiating spoke network appliance selects one of the multiple communication links. Following this selection, the initiating spoke network appliance proceeds to use the selected one of the multiple communication links to carry network traffic destined for the other spoke within the secure communication network.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a "network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

As used herein, the phrases "network path", "communication path", "network communication path", and "communication link" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for performing network communications in a hub and spoke network topology. The methods include: sending, by a first spoke network appliance, a dataset to a hub network appliance via at least a first communication link and a second communication link; receiving, by the first spoke network appliance, an instruction from the hub network appliance to communicate directly with a second spoke network appliance; and based at least in part on the instruction from the hub network appliance, performing, by the first spoke network appliance, network communications with the second spoke network appliance using a third communication link selected in part based upon a health status of the third communication link. In various instances of the aforementioned embodiments, the first spoke network appliance, the second spoke network appliance, and the hub network appliance are included in a software defined wide area network.

In some instances of the aforementioned embodiments, the dataset identifies a destination. In some such instances, the hub network appliance governs access to a secure network, the destination is a network device included in a local segment of the secure network, and the second spoke network appliance governs access to the local segment of the secure network. In some cases where the local segment of the secure network is a first segment of the secure network, the first spoke network appliance governs access to a second local segment of the secure network.

In various instances of the aforementioned embodiments where the dataset is a first dataset, performing network communications with the second spoke network appliance using the third communication link selected in part based upon the health status of the third communication link includes: sending, by the first spoke network appliance, a second dataset to the second spoke network appliance via at least the third communication link and a fourth communication link; determining a first health status of the third communication link and a second health status of the fourth communication link; comparing the first health status with the second health status, wherein the comparison of the first health status to the second health status reveals that the third communication link is better than the fourth communication link; and based at least in part on the comparison of the first health status to the second health status, selecting the third communication link for the performing network communications with the second spoke network appliance.

In some such instances, determining the first health status of the third communication link and the second health status of the fourth communication link is done by the first spoke network appliance. In various such instances, determining the first health status of the third communication link includes determining at least two characteristics of the third communication link. The at least two characteristics of the third communication link include at least one of: a latency of the third communication link; a rate at which network traffic is received via the third communication link; an error rate of the third communication link; or a cost of the third communication link. The method further includes combining the at least two characteristics of the third communication link to create the first health status.

Other embodiments provide network systems arranged in a hub and spoke topology. The network systems include: a hub network appliance and a spoke network appliance. The hub network appliance is configured to: receive a dataset from a first spoke network appliance via a first communication link and a second communication link, where the first spoke network appliance governs access to a first local segment of a secure network including the hub network appliance, and where the dataset indicates a destination for network traffic from the first spoke network appliance; determine that the destination is within a second local segment of the secure network, where access to the second local segment is governed by a second spoke network appliance; determine the existence of a set of communication links allowing direct communication between the first spoke network appliance and the second spoke network appliance; and communicate an instruction to the first spoke network appliance to perform network communications directly with the second spoke network appliance. The first spoke network appliance configured to: based at least in part on receiving the instruction from the hub network appliance to perform network communications directly with the second spoke network appliance, perform network communications with the second spoke network appliance using a third communication link selected in part based upon a health status of the third communication link.

Yet other embodiments provide non-transitory computer-readable media having stored therein instructions that when executed by a processing resource cause the processing resource to perform a method comprising: sending, by a first spoke network appliance, a dataset to a hub network appliance via at least a first communication link and a second communication link, wherein the dataset identifies a destination; receiving, by the first spoke network appliance, an instruction from the hub network appliance to communicate directly with a second spoke network appliance; based at least in part on the instruction from the hub network appliance, performing, by the first spoke network appliance, network communications with the second spoke network appliance using a third communication link selected in part based upon a health status of the third communication link.

Turning to FIG. 1A, network architecture 100 is shown including direct spoke network appliance 112b to spoke network appliance 112a communication links selectable based upon relative health and in part governed by a hub network appliance 119 in accordance with various embodiments. Hub network appliance 119 governs access to an enterprise secure communications network 114 that provides communications to various spoke network appliances 112 (i.e., spoke network appliance 112a, spoke network appliance 112b, and spoke network appliance 112c). Enterprise secure communication network 114 may be any type of communication network known in the art. Those skilled in the art will appreciate that, enterprise secure communication network 114 can be wireless network, a wired network, or a combination thereof that can be implemented as one of the various types of networks, such as an Intranet, a Local Area Network (LAN), a Wide Area Network (WAN), and/or the like. Further, enterprise secure communication network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Hub network appliance 119 provides access between enterprise secure communication network 114 and unsecure communication network 104. Unsecure communication network 104 may be any type of communication network known in the art. Those skilled in the art will appreciate that, enterprise secure communication network 104 can be wireless network, a wired network, or a combination thereof that can be implemented as one of the various types of networks, such as an Intranet, a LAN, a WAN, an Internet, and/or the like. Further, enterprise secure communication network 104 can either be a dedicated network or a shared network. The shared network represents an association of the different types of networks that use a variety of protocols, for example, HTTP, TCP/IP, WAP, and the like. Unsecure communication network 104 provides communication access to network devices 106a, 106b.

Enterprise secure communication network 114 provides for communications to/from a number of network segments or spokes where access to each of the network segments is governed by a respective spoke network appliance 112. Spoke network appliance 112a governs access to a local secure communication network 115a through which network devices 116a, 116b are connected; spoke network appliance 112b governs access to a local secure communication network 115b through which network devices 116c, 116d are connected; and spoke network appliance 112c governs access to a local secure communication network 115c through which network devices 116e, 116f are connected. Each of local secure communication networks 115 may be any type of communication network known in the art. Those skilled in the art will appreciate that, enterprise secure communication network 115 can be wireless network, a wired network, or a combination thereof that can be implemented as one of the various types of networks, such as an Intranet, a LAN, a WAN, and/or the like. Further, local secure communication network 115 can either be a dedicated network or a shared network. The shared network represents an association of the different types of networks that use a variety of protocols, for example, HTTP, TCP/IP, WAP, and the like.

A set of multiple communication links (shown as a dashed line 123) exist between spoke network appliance 112b and hub network appliance 119; and a set of multiple communication links (shown as a dashed line 122) exist between spoke network appliance 112b and spoke network appliance 112a. Each of hub network appliance 119, spoke network appliance 112a, spoke network appliance 112b, and spoke network appliance 112c includes a respective instance of a direct spoke connection application 111 (i.e., a respective one of a direct spoke connection application 111a, a direct spoke connection application 111b, a direct spoke connection application 111c, and a direct spoke connection application 111d as shown). As more fully described below, execution of direct spoke connection application 111 by combinations of hub network appliance 119, spoke network appliance 112a, spoke network appliance 112b, and/or spoke network appliance 112c cause network traffic to be routed within enterprise secure communication network 114 based at least in part on the health status of respective ones of communication links 122, 123.

Figure 1B:
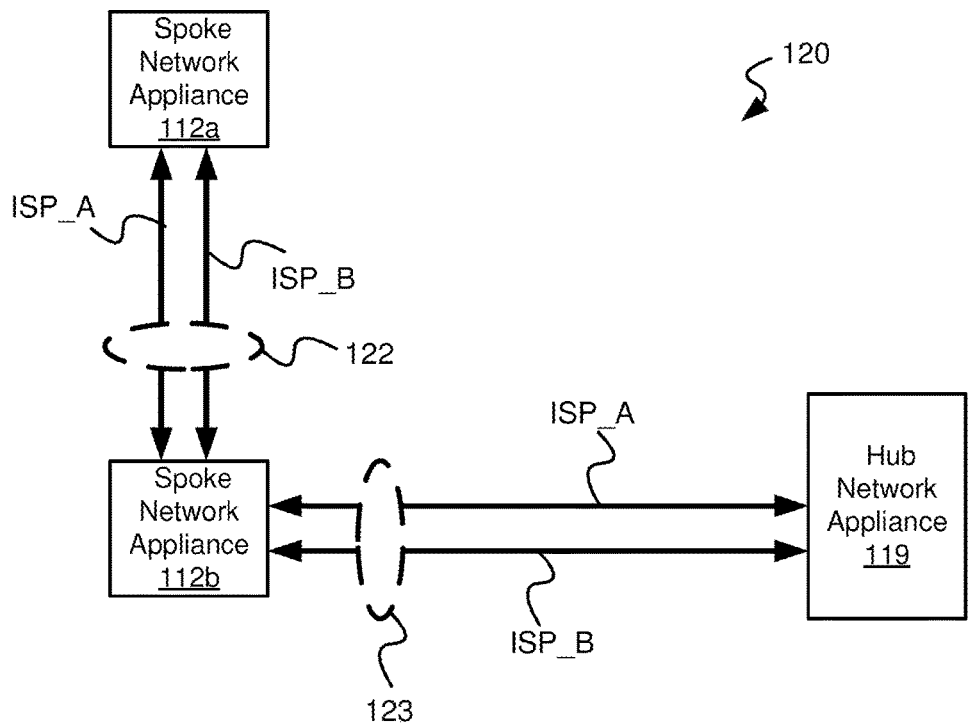

Turning to FIG. 1B, an architecture 120 shows an example detail of network architecture 100 focused on the set of multiple communication links 122 and the set of multiple communication links 123. As shown, two different ISPs are included in each of the sets of multiple communication links 122, 123. In particular, the set of multiple communication links 122 includes an ISP_A and an ISP_B providing a direct connection between spoke network appliance 112b and spoke network appliance 112a. The set of multiple communication links 123 includes the same ISP_A and ISP_B providing a direct connection between spoke network appliance 112b and hub network appliance 119. While in this embodiment, the same two ISPs are shown between spoke network appliance 112b and spoke network appliance 112a, and between spoke network appliance 112b and hub network appliance 119, it is possible that different combinations of communication links and/or communications providers may be used between different elements in enterprise secure communication network 114. Thus, for example, there may be three or more communication links between spoke network appliance 112b and hub network appliance 119, and only two communication links between spoke network appliance 112b and spoke network appliance 112a. As another example, the provider of one of the communication links between each of spoke network appliance 112b and spoke network appliance 112a and spoke network appliance 112b and nub network appliance 119 may be the same, but the provider of the other communication link is different. Based upon the disclosure provided herein, one of ordinary skill in the art will recognize a variety of combinations of communication link types and/or communication link providers that may be incorporated into the set of multiple communication links 122, and combinations that may be incorporated into the set of multiple communication links 123 in accordance with different embodiments.

Figure 1C:
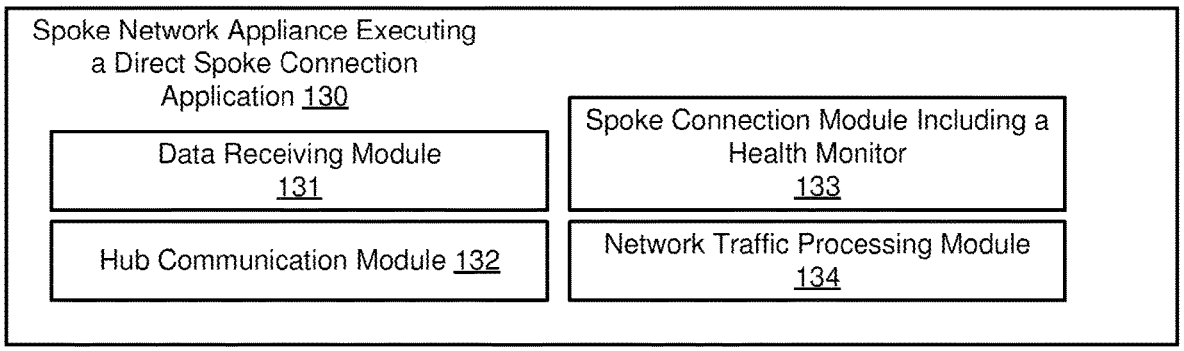

Turning to FIG. 1C, a spoke network appliance executing a direct spoke connection application 130 (e.g., spoke network appliance 112b executing direct spoke connection application 111b) is shown in accordance with some embodiments. As shown, spoke network appliance executing a direct spoke connection application 130 includes a data receiving module 131, a hub communication module 132, a spoke connection module including a health monitor 133, and a network traffic processing module 134.

Data receiving module 131 is configured to receive network traffic. In some cases, the network traffic is received from a hub network appliance, a spoke network appliance, or a network device. Any device or software known in the art for receiving network traffic may be used in relation to different embodiments.

Hub communication module 132 is configured to send an initial network traffic to a hub network appliance via two or more communication links. In some embodiments, the initial network traffic includes a request to open a network session. The receiving hub network appliance uses the initial network traffic to determine a destination of the network traffic, and where called for, determines a relative health status of each of the two or more communication links. Hub communication module 132 is further configured to receive communications from the hub network appliance. The communications include either an instruction that the spoke network appliance should communicate directly with another spoke network appliance in an enterprise secure communication network, or an instruction that the spoke network appliance should use a selected one of the two or more communication links to continue network communications with the hub network appliance.

Spoke connection module including a health monitor 133 is configured to send an initial network traffic to another spoke network appliance indicated by the hub network appliance. The initial network traffic is sent via two or more communication links. Spoke connection module including a health monitor 133 is further configured to determine a relative health status of each of the two or more communication links, and to select one of the two or more communication links to continue the network communications with the other spoke network appliance.

Network traffic processing module 134 is configured to perform network communications with a selected device over a selected communication link. Thus, for example, where the response from the hub network appliance instructs continued communication with the hub network appliance and use of a selected communication link, network traffic processing module 134 performs continued communication with the hub network appliance over the selected communication link.

Figure 1D:
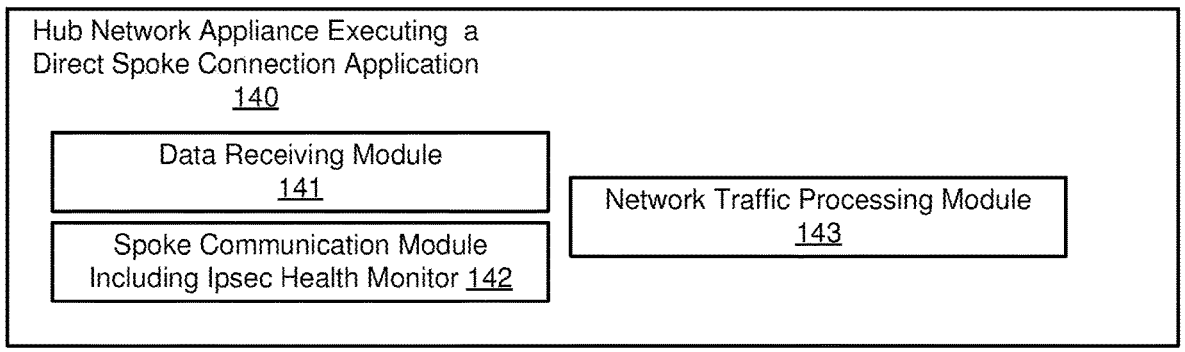

Turning to FIG. 1D, a hub network appliance executing a direct spoke connection application 140 (e.g., hub network appliance 119 executing direct spoke connection application 111d) is shown in accordance with some embodiments. As shown, hub network appliance executing a direct spoke connection application 140 includes a data receiving module 141, a spoke communication module including a health monitor 142, and a network traffic processing module 143.

Data receiving module 141 is configured to receive network traffic. In some cases, the network traffic is received from a spoke network appliance or a network device. Any device or software known in the art for receiving network traffic may be used in relation to different embodiments.

Spoke communication module including a health monitor 142 is configured to receive an initial network traffic from an initiating spoke network appliance via two or more communication links. In some embodiments, the initial network traffic includes a request to open a network session and a destination or target of the network traffic. The hub network appliance uses the initial network traffic to determine a destination of the network traffic, and where called for, determines a relative health status of each of the two or more communication links. Spoke communication module including a health monitor 132 is further configured to provide a communication to the initiating spoke network appliance including either an instruction that the spoke network appliance should communicate directly with another spoke network appliance in an enterprise secure communication network, or an instruction that the spoke network appliance should use a selected one of the two or more communication links to continue network communications with the hub network appliance.

Network traffic processing module 143 is configured to perform network communications with the initiating spoke network appliance where the instruction to the initiating spoke network appliance was to continue communications with the hub network appliance. This includes acting as an intermediary device direct communications between the initiating spoke network appliance and a target device.

Figure 1E:
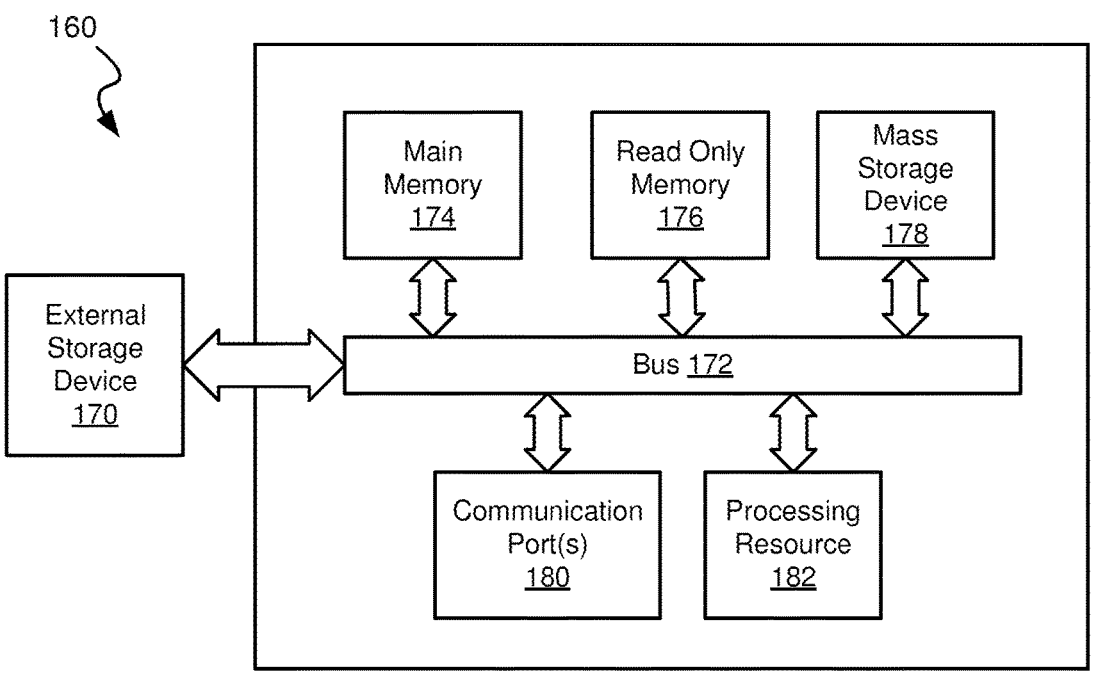

Turning to FIG. 1E, an example computer system 160 is shown in which or with which embodiments of the present disclosure may be utilized. As shown in FIG. 1E, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
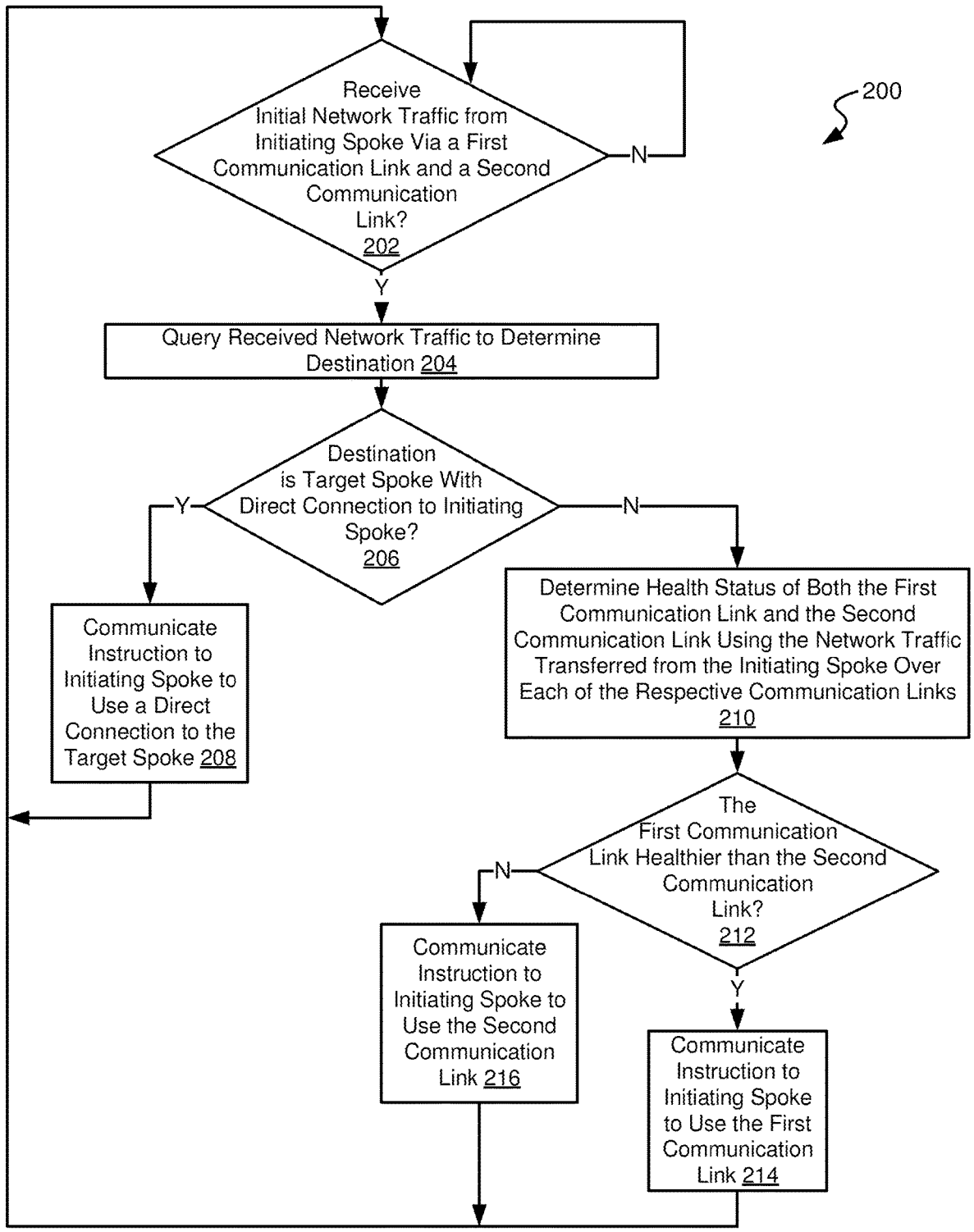
FIG. 2 is a flow diagram showing hub network appliance control of spoke network appliance communication from the perspective of the hub network appliance in accordance with some embodiments.

Turning to FIG. 2, a flow diagram 200 shows communication link health based hub network appliance control of spoke network appliance communication from the perspective of the hub network appliance in accordance with some embodiments. Following flow diagram 200, it is determined whether initial traffic has been received from an initiating spoke network appliance (block 202). The initial traffic includes a request to open a network session with an identified target device, and is received from at least two different communication links that communicably couple the receiving hub network appliance and the initiating spoke network appliance. The communication links may be provided by one or more communication service providers, by of different communication link types, and/or may have different characteristics. Based upon the disclosure provided herein, one of ordinary skill in the art will recognize a variety of communication links and/or communication service providers that may be used in relation to different embodiments. It is noted that while the embodiment discussed in relation to FIG. 2 involves two different communication links and evaluation of the health status of each of the two different communication links, other embodiments may involve three or more communication links.

Where network traffic has been received from an initiating spoke network appliance (block 202), the received network traffic is queried to identify a destination of the network traffic (block 204). It is determined whether the identified destination is within another spoke of the secure network of the hub network appliance, and the other spoke is accessed via a spoke network appliance (i.e., a target spoke network appliance) that has a direct communication link to the initiating spoke network appliance (block 206). Where the identified destination is within another spoke of the secure network of the hub network appliance that is accessed a spoke network appliance that has a direct communication link to the initiating spoke network appliance (block 206), the hub network appliance sends a communication to the initiating spoke network appliance directing it to use the existing direct connection to the target spoke network appliance to perform the desired network session (block 208).

Alternatively, where the identified destination is not within another spoke of the secure network of the hub network appliance that is accessed a spoke network appliance that has a direct communication link to the initiating spoke network appliance (block 206), the hub network appliance determines a health status of both the first communication link and the second communication link (block 210). The health status for each of the first communication link and the second communication link may include a number of different characteristics including, but not limited to, a latency of the network traffic over the respective communication link, a rate at which the network traffic is received over the respective communication link, an error rate of the received network traffic received over the respective communication link, and/or a cost of using the respective communication link. Based upon the disclosure provided herein, one of ordinary skill in the art will recognize a variety of characteristics that may be included in the health status in different embodiments.

The health status for the first communication link is compared with the health status for the second communication link to determine whether the first communication link is healthier than the second communication link (block 212). An algorithm weighting various characteristics in health status may be used to allow the comparison. For example, in one embodiment, a latency of the network traffic over the respective communication link is given a twenty-five percent (0.25) weight, a rate at which the network traffic is received over the respective communication link is given a twenty-five percent (0.25) weight, an error rate of the received network traffic received over the respective communication link is converted to an accuracy rate and given a forty percent (0.40) weight, and a cost of using the respective communication link is given a ten percent (0.10) weight. Conversion of the error rate to an accuracy rate may be done to both reflect a number of correct bits, and also to amplify any error. Thus, for example, an error rate of 0.000005 may be multiplied by one-hundred thousand (100, 000) and then subtracted from one (1) to yield 0.5 (i.e., 1−(0.000005*100000)). The weighted combination of the aforementioned four factors for each of the communication links is compared with that of weighted combinations for each of the communication links being evaluated. Based upon the disclosure provided herein, one of ordinary skill in the art will recognize a variety of weighting combinations that may be used in relation to health status characteristics, and/or manipulations of health status characteristics that may be used to yield meaningful and comparable values for different communication links.

Where the health status of the first communication link is more favorable than that of the second communication link (block 212), the hub network appliance communicates an instruction to the spoke network appliance directing the spoke network appliance to perform the desired network communications over the first communication link (block 214). Alternatively, where the health status of the first communication link is not more favorable than that of the second communication link (block 212), the hub network appliance communicates an instruction to the spoke network appliance directing the spoke network appliance to perform the desired network communications over the second communication link (block 216).

Figure 3A:
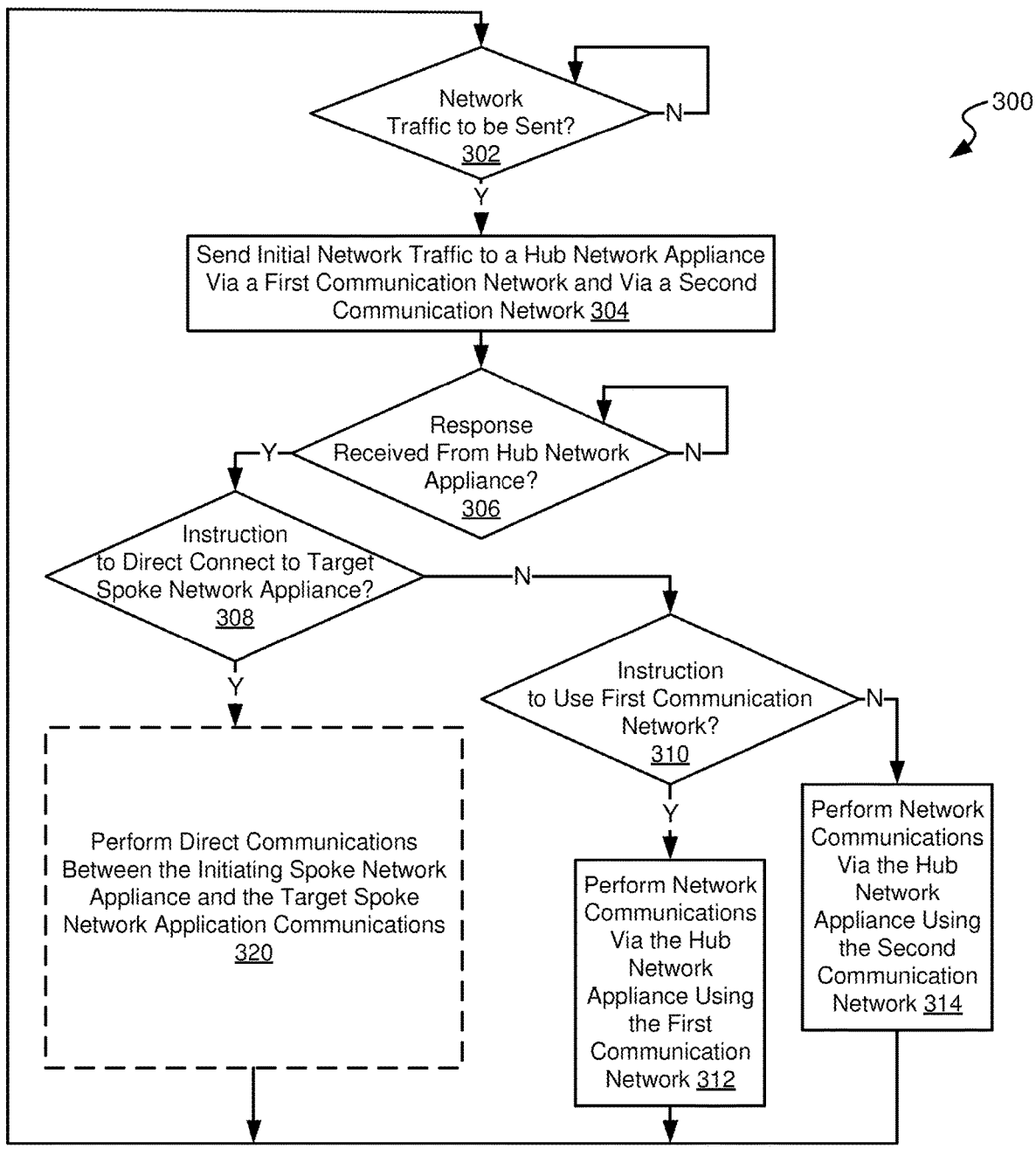
FIGS. 3A-3B are flow diagrams showing hub network appliance control of spoke network appliance communication from the perspective of the spoke network appliance in accordance with various embodiments.
Figure 3B:
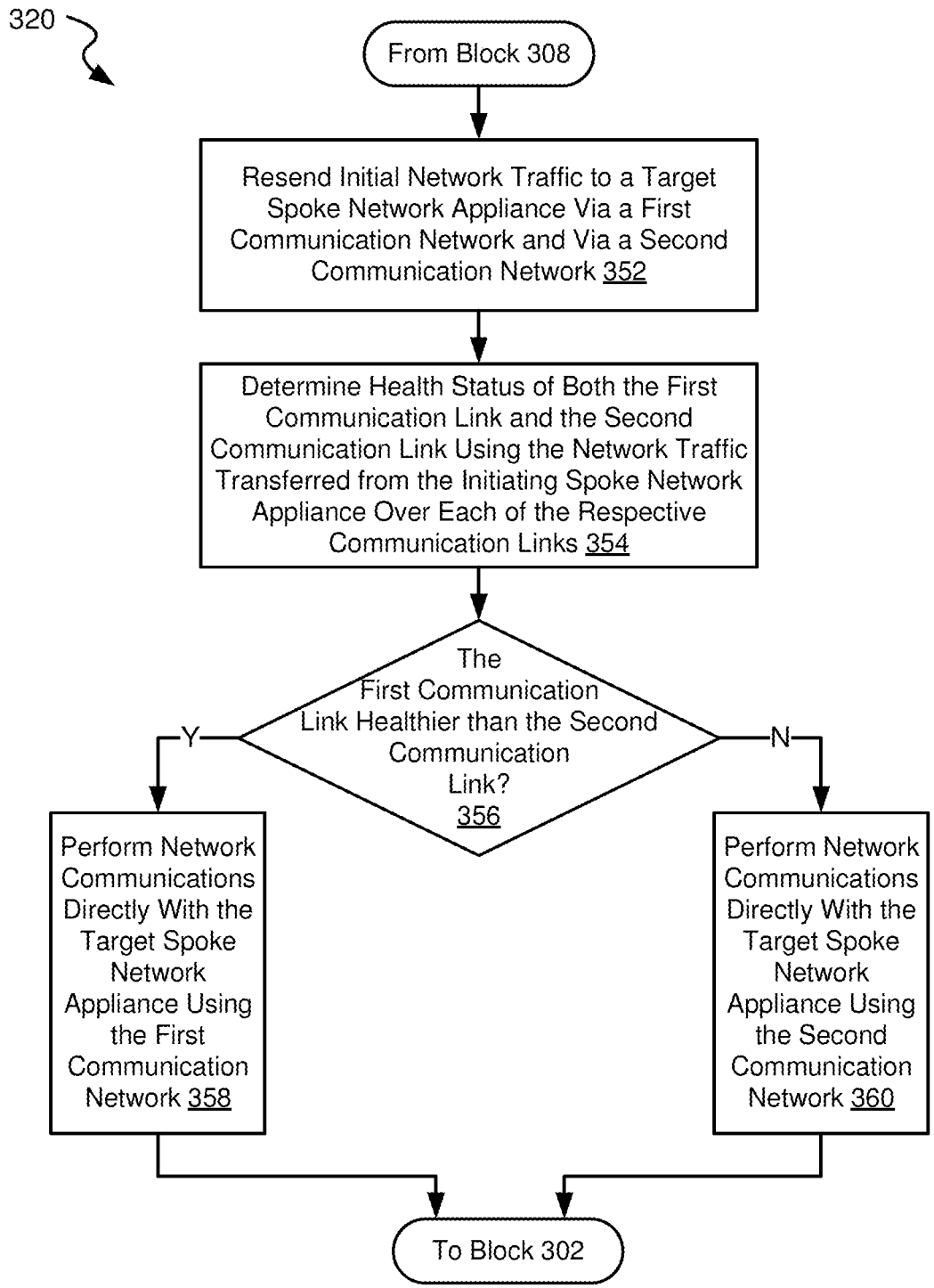

Turning to FIGS. 3A-3B, flow diagrams 300, 320 show hub network appliance control of spoke network appliance communication from the perspective of an initiating spoke network appliance in accordance with various embodiments. Turning to FIG. 3A and following flow diagram 300, it is determined whether network traffic is to be sent via the initiating spoke network appliance (i.e., a network session is desired) (block 302). Network traffic is to be sent whenever a network device coupled to a local secure communication network governed by the initiating spoke network appliance is attempting to communicate with another network device outside of the local secure communication network. Where network traffic is to be sent (block 302), the initiating spoke network appliance sends initial network traffic to a hub network appliance (block 304). The initial network traffic includes a request to open a network session and is sent via at least two different communication links that communicably couple the receiving hub network appliance and the initiating spoke network appliance. The communication links may be provided by one or more communication service providers, may be different types of communication links, and/or have different characteristics. Based upon the disclosure provided herein, one of ordinary skill in the art will recognize a variety of communication links and/or communication service providers that may be used in relation to different embodiments. It is noted that while the embodiment discussed in relation to FIG. 3 involves two different communication links and evaluation of the health status of each of the two different communication links, other embodiments may involve three or more communication links.

The hub network appliance receiving the initial network traffic via the two communication links performs the processes described above in relation to FIG. 2 to determine how a desired network session will be performed. The initiating spoke network appliance awaits a response from the hub network appliance directing how future network traffic corresponding to the initial network traffic is to be communicated (block 306).

Once the response from the hub network appliance is received (block 306), it is determined if the response includes an instruction for the initiating spoke network appliance to direct connect to another spoke network appliance governing (i.e., a target spoke) access to a spoke including a network device that is the destination of the network traffic (block 308). Where the response from the hub network appliance does not include an instruction to direct connect to another spoke network appliance (block 308), it is determined whether the response from the hub network appliance includes an instruction to use the first communication link (block 310). Where the response from the hub network appliance includes an instruction to use the first communication link (block 310), the initiating spoke network appliance directs the network traffic to the hub network appliance over the first communication link (block 312). Alternatively, where the response from the hub network appliance does not include an instruction to use the first communication link (block 310), the initiating spoke network appliance directs the network traffic to the hub network appliance over the second communication link (block 314).

Alternatively, where the response from the hub network appliance includes an instruction to direct connect to another spoke network appliance (block 308), direct network communications between the initiating spoke network appliance and the target spoke network appliance are performed (block 320). Block 320 is shown in dashed lines as it is represented by flow diagram 320 (purposefully the same number) shown in FIG. 3B.

the initiating spoke network appliance resends the initial network traffic to the spoke network appliance identified in the instruction from the hub network appliance (block 320). The initial network traffic includes a request to open a network session and is sent via at least two different communication links that communicably couple the initiating spoke network appliance and the target spoke network appliance. The initiating spoke network appliance performs network communications directly with the target spoke network appliance (block 322). Block 322 is shown in dashed lines as it is represented by flow diagram 322 (purposefully the same number) shown in FIG. 3B.

Turning to FIG. 3B, flow diagram 320 representing block 320 (purposefully the same number) of FIG. 3A shows a method in accordance with some embodiments for performing direct spoke network appliance to spoke network appliance. Following flow diagram 320, the initiating spoke network appliance resends the initial network traffic to the target spoke network appliance identified in the instruction from the hub network appliance (block 352). The initial network traffic includes a request to open a network session and is sent via at least two different communication links that communicably couple the initiating spoke network appliance and the target spoke network appliance.

The initiating spoke network appliance determines a health status of both the first communication link and the second communication link (block 354). The communication links between the initiating spoke network appliance and the target spoke network appliance may be provided by one or more communication service providers, may be of different types of communication links, and/or have different characteristics. Based upon the disclosure provided herein, one of ordinary skill in the art will recognize a variety of communication links and/or communication service providers that may be used in relation to different embodiments. In some embodiments, the first communication link between the initiating spoke network appliance and the target spoke network appliance is the same type of communication link and provided by the same communication service provider as the first communication link between the initiating spoke network appliance and the hub network appliance. In other embodiments, the first communication link between the initiating spoke network appliance and the target spoke network appliance is either a different type of communication link or not provided by the same communication service provider as the first communication link between the initiating spoke network appliance and the hub network appliance. Similarly, in various embodiments, the second communication link between the initiating spoke network appliance and the target spoke network appliance is the same type of communication link and provided by the same communication service provider as the second communication link between the initiating spoke network appliance and the hub network appliance. In other embodiments, the second communication link between the initiating spoke network appliance and the target spoke network appliance is either a different type of communication link or not provided by the same communication service provider as the second communication link between the initiating spoke network appliance and the hub network appliance. Further, while the embodiment discusses two communication links between the initiating spoke network appliance and the target spoke network appliance, three or more communication links may be available and may be considered for carrying the network traffic.

Similar to that described above in relation to FIG. 2, the health status for each of the first communication link and the second communication link may include a number of different characteristics including, but not limited to, a latency of the network traffic over the respective communication link, a rate at which the network traffic is received over the respective communication link, an error rate of the received network traffic received over the respective communication link, and/or a cost of using the respective communication link. Based upon the disclosure provided herein, one of ordinary skill in the art will recognize a variety of characteristics that may be included in the health status in different embodiments.

The health status for the first communication link is compared with the health status for the second communication link to determine whether the first communication link is healthier than the second communication link (block 356). Similar to that described above in relation to FIG. 2, an algorithm weighting various characteristics in health status may be used to allow the comparison. For example, in one embodiment, a latency of the network traffic over the respective communication link is given a twenty-five percent (0.25) weight, a rate at which the network traffic is received over the respective communication link is given a twenty-five percent (0.25) weight, an error rate of the received network traffic received over the respective communication link is converted to an accuracy rate and given a forty percent (0.40) weight, and a cost of using the respective communication link is given a ten percent (0.10) weight. Conversion of the error rate to an accuracy rate may be done to both reflect a number of correct bits, and also to amplify any error. Thus, for example, an error rate of 0.000005 may be multiplied by one-hundred thousand (100,000) and then subtracted from one (1) to yield 0.5 (i.e., 1−(0.000005*100000)). The weighted combination of the aforementioned four factors for each of the communication links is compared with that of weighted combinations for each of the communication links being evaluated. Based upon the disclosure provided herein, one of ordinary skill in the art will recognize a variety of weighting combinations that may be used in relation to health status characteristics, and/or manipulations of health status characteristics that may be used to yield meaningful and comparable values for different communication links.

Where the health status of the first communication link is more favorable than that of the second communication link (block 356), the initiating spoke network appliance selects the first communication link and performs network communications with the target spoke network appliance via the first communication link (block 358). Alternatively, where the health status of the first communication link is not more favorable than that of the second communication link (block 354), the initiating spoke network appliance selects the second communication link and performs network communications with the target spoke network appliance via the second communication link (block 360).

In conclusion, the present disclosure provides for novel systems, devices, and methods. While detailed descriptions of one or more embodiments have been given above, various alternatives, modifications, and equivalents will be apparent to those skilled in the art without varying from the spirit of the claims. Therefore, the above description should not be taken as limiting the scope of the inventions, which are defined by the appended claims.

What is claimed is:

1. A method for performing network communications in a hub and spoke network topology, the method comprising:
sending, by a first spoke network appliance, a dataset to a hub network appliance via at least a first communication link and a second communication link, wherein the hub network appliance determines whether a destination of traffic in the dataset is reachable by a second spoke network appliance in communication with the hub network appliance;

responsive to determining that the destination is reachable by the second spoke network appliance, receiving, by the first spoke network appliance, an instruction from the hub network appliance to communicate directly with the second spoke network appliance;

based at least in part on the instruction from the hub network appliance, performing, by the first spoke network appliance, sending a second dataset to the second spoke network appliance via at least a third communication link and a fourth communication link, wherein network communications with the second spoke network appliance using a third communication link selected in part based upon a health status of the third communication link; and responsive to determining that the destination is not reachable by the second spoke network appliance, receiving, by the first spoke network appliance, an indication of which of the first and second communication link has been selected for communication with the hub network appliance in part based upon a health status of the first and second communication links.

2. The method of claim 1, wherein the dataset identifies a destination.

3. The method of claim 2, wherein the hub network appliance governs access to a secure network, and wherein the destination is a network device included in a local segment of the secure network, and wherein the second spoke network appliance governs access to the local segment of the secure network.

4. The method of claim 3, wherein the local segment of the secure network is a first segment of the secure network, and wherein the first spoke network appliance governs access to a second local segment of the secure network.

5. The method of claim 1, wherein the first spoke network appliance, the second spoke network appliance, and the hub network appliance are included in a software defined wide area network.

6. The method of claim 1, wherein determining the first health status of the third communication link includes:

determining at least two characteristics of the third communication link, wherein the at least two characteristics of the third communication link are selected from a group consisting of: a latency of the third communication link; a rate at which network traffic is received via the third communication link; an error rate of the third communication link; and a cost of the third communication link; and combining the at least two characteristics of the third communication link to create the first health status.

7. The method of claim 1, wherein determining the second health status of the fourth communication link includes:

determining at least two characteristics of the fourth communication link, wherein the at least two characteristics of the fourth communication link are selected from a group consisting of: a latency of the fourth communication link; a rate at which network traffic is received via the fourth communication link; an error rate of the fourth communication link; and a cost of the fourth communication link; and combining the at least two characteristics of the fourth communication link to create the second health status.

8. A network system arranged in a hub and spoke topology, the system comprising:

a hub network appliance configured to:

receive a dataset from a first spoke network appliance via a first communication link and a second communication link, wherein the first spoke network appliance governs access to a first local segment of a secure network including the hub network appliance, and wherein the dataset indicates a destination for network traffic from the first spoke network appliance;

determine whether the destination is within a second local segment of the secure network, wherein access to the second local segment is governed by a second spoke network appliance;

determine whether there exists a set of communication links allowing direct communication between the first spoke network appliance and the second spoke network appliance; and responsive to the destination being within the second local segment of the secure network and an existing set of communication links allowing direct communication, communicate an instruction to the first spoke network appliance to perform network communications directly with the second spoke network appliance; and the first spoke network appliance configured to:

based at least in part on receiving the instruction from the hub network appliance to perform network communications directly with the second spoke network appliance including sending a second dataset to the second spoke network appliance via at least a third communication link and a fourth communication link, and perform network communications with the second spoke network appliance using the third or the fourth communication link selected in part based upon a health status of the third and fourth communication links.

9. The system of claim 8, the first spoke network appliance and the hub network appliance are included in a software defined wide area network.

10. The system of claim 8, wherein determining the first health status of the third communication link and the second health status of the fourth communication link is done by the first spoke network appliance.

11. The system of claim 8, wherein determining the first health status of the third communication link includes:

determining at least two characteristics of the third communication link, wherein the at least two characteristics of the third communication link are selected from a group consisting of: a latency of the third communication link; a rate at which network traffic is received via the third communication link; an error rate of the third communication link; and a cost of the third communication link; and combining the at least two characteristics of the third communication link to create the first health status.

12. The system of claim 11, wherein determining the second health status of the fourth communication link includes:

determining at least two characteristics of the fourth communication link, wherein the at least two characteristics of the fourth communication link are selected from a group consisting of: a latency of the fourth communication link; a rate at which network traffic is received via the fourth communication link; an error rate of the fourth communication link; and a cost of the fourth communication link; and combining the at least two characteristics of the fourth communication link to create the second health status.

13. A non-transitory computer-readable medium, the non-transitory computer readable medium having stored therein instructions that when executed by a processing resource cause the processing resource to perform a method comprising:

sending, by a first spoke network appliance, a dataset to a hub network appliance via at least a first communication link and a second communication link, wherein the hub network appliance determines whether a destination of traffic in the dataset is reachable by a second spoke network appliance in communication with the hub network appliance;

responsive to determining that the destination is reachable by the second spoke network appliance, receiving, by the first spoke network appliance, an instruction from the hub network appliance to communicate directly with the second spoke network appliance;

based at least in part on the instruction from the hub network appliance, performing, by the first spoke network appliance, sending a second dataset to the second spoke network appliance via at least a third communication link and a fourth communication link, wherein network communications with the second spoke network appliance using a third communication link selected in part based upon a health status of the third communication link; and responsive to determining that the destination is not reachable by the second spoke network appliance, receiving, by the first spoke network appliance, an indication of which of the first and second communication link has been selected for communication with the hub network appliance in part based upon a health status of the first and second communication links.

14. The non-transitory computer-readable medium of claim 13, wherein the hub network appliance governs access to a secure network, and wherein the destination is a network device included in a local segment of the secure network, and wherein the second spoke network appliance governs access to the local segment of the secure network.

15. The non-transitory computer-readable medium of claim 14, wherein the local segment of the secure network is a first segment of the secure network, and wherein the first spoke network appliance governs access to a second local segment of the secure network.

16. The non-transitory computer-readable medium of claim 13, wherein determining the first health status of the third communication link includes:

determining at least two characteristics of the third communication link, wherein the at least two characteristics of the third communication link are selected from a group consisting of: a latency of the third communication link; a rate at which network traffic is received via the third communication link; an error rate of the third communication link; and a cost of the third communication link; and combining the at least two characteristics of the third communication link to create the first health status.

\* \* \* \* \*